C. H. Brown,
Steam-Boiler Indicator.
No. 1,473. Reissued May 19, 1863.
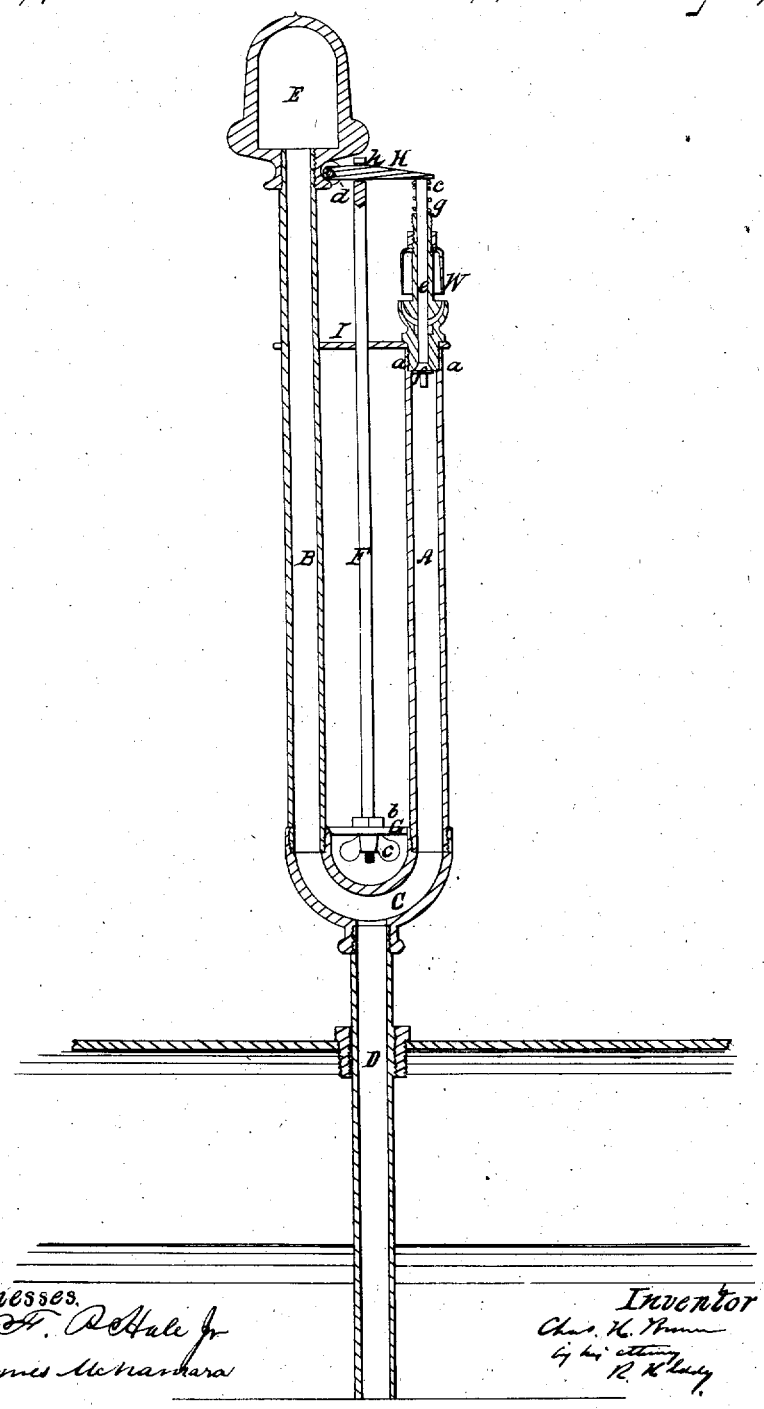
Witnesses.
F. A. Hale Jr
James McNamara
Inventor
Chas. H. Brown
by his attorney
R. K. Lady

UNITED STATES PATENT OFFICE.

CHARLES H. BROWN, OF FITCHBURG, MASSACHUSETTS.

IMPROVED LOW-WATER DETECTOR FOR STEAM-BOILERS.

Specification forming part of Letters Patent No. 29,455, dated August 7, 1860; Reissue No. 1,473, dated May 19, 1863.

*To all whom it may concern:*

Be it known that I, CHARLES H. BROWN, of Fitchburg, in the county of Worcester and State of Massachusetts, have invented a new and useful Low-Water-Alarm Apparatus for Steam-Boilers; and I do hereby declare that the following is a full, clear, and exact description of the same, reference being had to the accompanying drawing, forming part of this specification, said drawing representing a central and vertical section of the apparatus.

My invention is a combination consisting not only of an expansion-tube, its valve-seat and valve, and a whistle or its equivalent, but of a mechanism or apparatus so arranged and combined therewith as to produce during expansion of such tube a counter movement of the valve in a direction opposite to that in which the valve-seat may be moved; the purpose of my invention being that when the water in the boiler may fall below a certain level the expansion of the mechanism by the action of the heat of the steam therein shall cause not only the valve to move from its seat, but at the same time the seat to move away from the valve, thereby, as it were, producing a double action of the whistle-valve or its equivalent, and insuring a prompt and certain opening of the valve in order to enable steam to rush through the whistle and sound an alarm; and my invention further consists in the within-described peculiar combination of mechanical devices by which the counter-movement of the valve is effected; and also the peculiar arrangement of the two expansion-pipes, their valve, valve-seat, and whistle-lever, and the rod of such lever, and also their arrangement and combination with an air-vessel, as hereinafter described.

To enable those skilled in the art to make and use my invention, I will proceed to describe its construction and operation.

A and B are two upright pipes, of brass or other metal, having a suitable capability of expansion by heat. They are connected together at their lower ends by a bend or elbow-pipe, C, and become like an inverted siphon. The said elbow pipe or bend C, which is intended to be placed at some distance above or away from the boiler, has attached to it a single stand-pipe, D, which opens into it and serves to connect it with the boiler. The said pipe D at its lower end opens into the boiler at a level below that at which it may be desirable that the water in the boiler may never fall.

At the top of the pipe A, which is shorter than the pipe B, there is secured a steam-whistle, W, the seat *a* of whose valve *f* is rigidly secured to the said pipe A. At the top of the pipe B, which extends some distance above the pipe A, there is an air-chamber, E.

Between the two pipes A and B there is arranged an upright iron rod, F, the lower part of which is secured to a fixed cross-piece, G, (arranged within and across the bend C,) by means of two nuts, *b* and *c*, fitted to a screw-thread cut on the rod. One of the said nuts is above and the other is below the said cross-piece, the rod being caused to pass through the said cross-piece. The upper part of the said rod is perforated to receive the lever H, which operates the valve of the whistle, one end of the said lever being attached by a pin or hinge-joint, *d*, to the air-chamber E, or to the upper part of the pipe B. The other end of such lever extends across the head *e'* of the stem *e* of the whistle-valve *f*. This valve is of the puppet kind, and closes with an upward movement. It has a spiral spring, *g*, applied to its stem *e*, and arranged between the head *e'* thereof and the top of the whistle, such spring being for the purpose of keeping the valve closed when there may be no pressure of steam in the boiler. When the pressure in the boiler may be slightly above that of the atmosphere, it will be sufficient to close the valve irrespective of the spring.

The slot *h*, made in the rod F for the lever H, should be deep enough to allow a slight amount of play upward and downward to the said lever. Some distance below the said lever there is secured between the pipes A B a fixed guide, I, to keep the rod F upright.

The operation of the apparatus will be as follows: So long as the level of the water in the boiler may be above the lower end of the pipe D and there is any considerable pressure of steam in the boiler, the pipes A and B will be kept filled with water, which, being out of reach of the circulation of the water within the boiler, will not become heated near as hot as the steam within the boiler. While such may be the case, the pipes A and B will not expand sufficiently to open the valve *f*; but when the water in the boiler may fall below the mouth of the pipe D the water within the pipes A B C D, by its gravitation, will fall therein and out of them, and its place will be supplied by steam from the steam-space of the boiler. This steam, being hotter than the water, will heat the pipes A B to such a degree as to produce almost instantaneously such an expansion of them lengthwise that the valve *f* will be opened so as to permit the escape of steam to and through the whistle. In this way an alarm will be sounded, the result being effected not only by the upward movement of the valve-seat *a* away from the valve, but by the simultaneous downward movement of the valve away from the seat thereof. Such movement of the seat will be produced by the expansion lengthwise of the pipe A, the movement of the valve being effected in part by the expansion of the pipe B, which, by causing that end of the lever which is attached to the said pipe B to rise and the other end to fall, will effect the depression of the valve-stem. The rod F, which will never be perceptibly expanded, serves as a support for the fulcrum of the lever. As soon as the water may have arisen above the level of the mouth or lower end of the pipe D, it, by the pressure of the steam, will be again forced up the pipes A and B, into which it will enter as fast as the steam therein may be condensed. The pipes by this water will have their temperature lowered, in consequence of which they will contract lengthwise, and effect the closing of the valve by the downward movement of the seat due to the contraction of the pipe A, and by the upward movement of the valve under the influence of the pressure of the spring *g*, which will be permitted by that action which will result to the lever by the contraction of the pipe B.

The air-chamber E is for the reception of the air which shall get into the pipe B, and which without the air-vessel or a very greatly-extended length of pipe would prevent the steam filling the whole, or as much of the said pipe as might be desirable to produce the requisite degree of expansion of the pipe. The outlet provided by the whistle obviates the necessity of an air-chamber on the pipe A, as by depressing and opening the valve of such pipe the air will escape therefrom or be driven out by the steam. The play allowed to the lever H in the slot *h* will permit the expansion due to the heat of the water in the pipes to take place and not open the valve.

The nuts *b c* serve to adjust the rod so that the valve may open the instant a certain degree of expansion of the pipes may have been attained.

From the above it will be seen that I have combined with the expansion-tube A, its valve-seat, and valve, and whistle certain devices or mechanism, which, by its mode of operation, will produce during expansion of the tube A and the movement of the valve-seat consequent thereto, a counter movement of the valve—that is, a movement of it in an opposite direction. These devices for effecting the said counter movement of the valve are the lever H, the rod F, and the expansion-tube B, connected with the pipe C.

It may be observed that the air-vessel E, in its application to the single expansion-pipe B, can only discharge its air through the pipe A, such discharge taking place when the pipes are filled with the steam and the valve is open. Thus it will be seen that the pipe A not only performs its function of expanding and opening the valve, but another—viz., that of aiding the pipe B in the discharge of its air. The peculiar combination and arrangement of the air-vessel with the two pipes and the remainder of the apparatus is therefore productive of important results.

What therefore I claim, and desire to secure by Letters Patent, is—

1. A combination consisting not only of an expansion-tube, its valve-seat and valve, and a whistle or its equivalent, but a mechanism or apparatus so arranged and combined therewith as to produce, during the expansion of such tube and while the valve-seat is being moved in one direction by such expansion, a counter or opposite movement of the valve, substantially as specified.

2. The combination of the expansion-pipe B, the lever H, and the rod F, in their application to or combination with the tube A, the valve-seat, valve, and whistle thereof, as arranged and applied together, substantially as specified.

3. The arrangement of the pipes A B, the valve *f*, the valve-seat *a*, the whistle W, the lever H, and the rod F, and also their arrangement and combination with an air-vessel, E, as described.

CHARLES H. BROWN.

Witnesses:
JAS. M. WOODBURY,
GEORGE S. JONES.